(12) United States Patent  
Jouppi

(10) Patent No.: US 7,720,353 B1  
(45) Date of Patent: *May 18, 2010

(54) PARALLEL COMMUNICATION STREAMS FROM A MULTIMEDIA SYSTEM

(75) Inventor: Norman Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1334 days.

This patent is subject to a terminal disclaimer.

(21) Appl. No.: 11/158,457

(22) Filed: Jun. 21, 2005

(51) Int. Cl.  
*H04N 5/76* (2006.01)

(52) U.S. Cl. ........................................ 386/92

(58) Field of Classification Search .............. 348/385.1, 348/387.1; 386/95, 96, 98, 108, 92  
See application file for complete search history.

(56) References Cited

U.S. PATENT DOCUMENTS

| | | | | |
|---|---|---|---|---|
| 3,681,524 A | * | 8/1972 | Nicholls | 360/72.2 |
| 4,868,682 A | * | 9/1989 | Shimizu et al. | 386/96 |
| 6,335,754 B1 | * | 1/2002 | Endo et al. | 348/37 |
| 6,549,215 B2 | * | 4/2003 | Jouppi | 345/660 |
| 6,889,120 B2 | | 5/2005 | Jouppi | |
| 7,120,313 B2 | * | 10/2006 | Kotake et al. | 382/282 |
| 2001/0040671 A1 | * | 11/2001 | Metcalf | 353/94 |
| 2004/0021767 A1 | * | 2/2004 | Endo et al. | 348/42 |

* cited by examiner

*Primary Examiner*—David E Harvey

(57) ABSTRACT

A multi-stream multimedia system is provided for providing simultaneous parallel communication streams from a plurality of communication devices, displaying the simultaneous parallel communication streams on a plurality of presentation devices, providing a high precision time code for synchronizing the simultaneous parallel communication streams, and recording each of the simultaneous parallel communication streams on a computer using the high precision time code.

20 Claims, 3 Drawing Sheets

PARALLEL COMMUNICATION STREAMS FROM A MULTIMEDIA SYSTEM

BACKGROUND

1. Technical Field

The present invention relates generally to multimedia systems and more specifically to multi-stream multimedia systems.

2. Background Art

In the past, video camera and audio systems were developed for improving communication among individuals who are separated by distance and/or time. The systems and the process are now referred to as "videoconferencing". Videoconferencing sought to duplicate, to the maximum extent possible, the full range, level and intensity of interpersonal communication and information sharing which would occur if all the participants of a meeting were "face-to-face" in the same room at the same time.

In addition to spoken words, demonstrative gestures, and behavioral cues, face-to-face contact often involves sitting down, standing up, and moving around to look at objects or people. This combination of spoken words, gestures, visual cues, and physical movement significantly enhances the effectiveness of communication in a variety of contexts, such as "brainstorming" sessions among professionals in a particular field, consultations between one or more experts and one or more clients, sensitive business or political negotiations, and the like.

Behavioral scientists know that interpersonal communication involves a large number of subtle and complex visual cues, referred to by names like "gaze" and "eye contact," which provide additional information over and above the spoken words and explicit gestures. These cues are, for the most part, processed subconsciously by the people, and often communicate vital information.

In situations where all the people cannot be in the same place at the same time, the beneficial effects of face-to-face contact will be realized only to the extent that a remotely located person, or "user", can be "recreated" at the site of the meeting where the "participants" are present.

In robotic telepresence, a remotely controlled robot simulates the presence of the user. The overall experience for the user and the participants interacting with the robotic telepresence device is similar to videoconferencing, except that the user has a freedom of motion and control over the robot and video input that is not present in traditional videoconferencing. The robot platform typically includes a camera, a display device, a motorized platform that includes batteries, a control computer, and a wireless computer network connection. An image of the user is captured by a camera at the user's location and displayed on the robotic telepresence device's display at the meeting.

In one previous approach, a robotic device was built on a remote controlled chassis. The robotic device used a single small camera with a relatively small field of view and low resolution. This device shared problems with videoconferencing in that the user had "tunnel vision." The user was not provided with a peripheral view of the environment as compared to human peripheral vision. In addition, the central resolution of the remote camera was much lower than that of the human eye, which made it difficult to remotely read anything other than very large text.

The robotic device displayed the user's image on a small LCD screen about three inches tall, which did not move independently of the robotic platform. This display did not preserve gaze or eye contact between the user and the participants interacting with the remote user via the robot. This made it difficult for meeting participants to relate naturally to the user of the robotic device.

In the past, eye contact has been preserved over only a small field of view (roughly 25°) by the use of a "reciprocal video tunnel". This system places a half-silvered mirror in front of a monitor, so that a camera can capture the view of a user sitting in front of the monitor. Two users sitting in front of such monitors at different locations can then make eye contact with each other. Unfortunately this design is not scalable to implementations covering larger fields of view or to preserve gaze. Also, the use of a half-silvered mirror in front of the monitor results in reduced contrast for images from the meeting location, as well as spurious reflections from the user's own location.

Furthermore, since there are only two participants using the system, it is obvious to whom each user is speaking, so many of the benefits of eye contact are not needed. Eye contact is much more important when more than two participants interact with each other, since eye contact in particular can be used for selecting participants and signifying attention.

Just as with other media such as telephones or television, it is often useful to have recordings of events captured using those technologies. Telephone and other audio conversations can be recorded using audio tape recorders. Television broadcasts are commonly recorded using videocassette recorders (VCRs) or digital video recorders (DVRs). These recordings can be used to preserve important events, provide documentary descriptions of remote places or times, provide entertainment and amusement, and have many other uses.

DISCLOSURE OF THE INVENTION

The present invention provides a multi-stream multimedia system for providing simultaneous parallel communication streams from a plurality of communication devices, displaying the simultaneous parallel communication streams on a plurality of presentation devices, providing a high precision time code for synchronizing the simultaneous parallel communication streams, and recording each of the simultaneous parallel communication streams using the high precision time code.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1A:
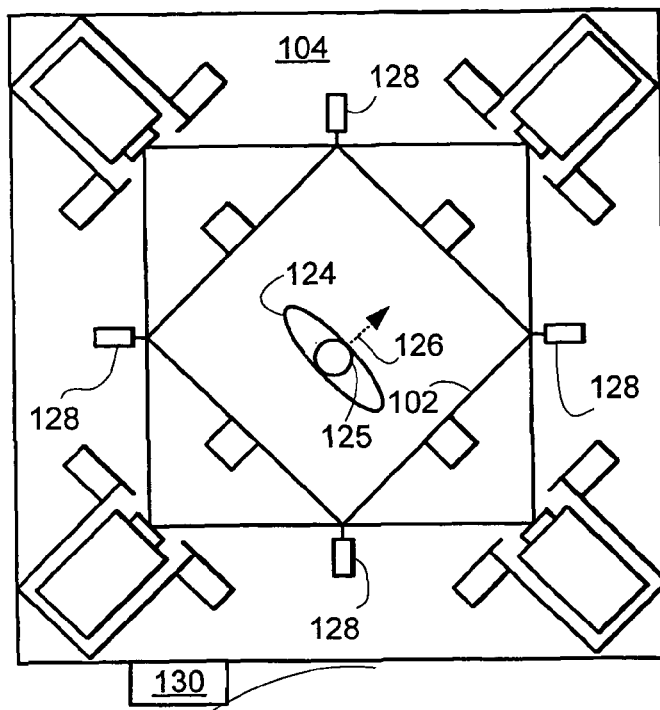
FIGS. 1A and 1B show a Mutually-Immersive Mobile Telepresence (E-Travel) System in accordance with an embodiment of the present invention.

The present invention relates to a telepresence video recorder system for a telepresence system.

A goal of telepresence is to recreate to the greatest extent possible, both for the user and the people at the remote location, the sensory experience relevant for business interactions of the user actually being in the remote location. Part of this experience is creating a full 360° surround visual and audio experience of the remote location for the user. The system consists of two parts, the user's display cube at the user's location and the surrogate at the remote location. The surrogate is connected to the user's display cube via high-speed networking, and stands in the place of the user at the remote location.

A user sits in a room showing the remote meeting location and a robot device is located at a remote meeting location. Video and audio are transmitted between the display and the robot device so that the user has the feeling of being present at the remote location by seeing it in a surround view, and the people or meeting participants at the remote location have the feeling that the user is present by panels showing images of the head of the user; i.e., the feeling of telepresence. The robot device may have a humanoid as well as a non-humanoid shape, and is referred to as a "surrogate".

The surrogate has a "head" made from four LCD panels. Live video of the user's face is displayed on all four sides of the surrogate. Four cameras in the corners of the surrogate's head together capture 360-degree surround live video from the surrogate's location for display on the four walls of the user's display cube.

Four directional microphones in the corners of the surrogate's head capture the remote sound field. Each corner of the surrogate head also contains a speaker. The surrogate contains computers for connecting to the cameras and microphones, processing data, and sending it to the user in the user's display cube. These computers also receive live video of the users head from the four corners of the user's display cube and display them on the four LCD screens of the surrogates head. They also receive audio signals from the user, process them, and output them to the surrogate head's speakers.

The video from the four cameras in the surrogate's head is compressed and transmitted over a high-speed speed network to computers at the users location. This video is then projected on the walls of the user's display cube by four projectors. The projectors are housed in "hush boxes" to make them virtually inaudible. Speakers are mounted in the corners and output through gaps between the projection screens. The hush boxes are built using sound isolation techniques familiar to those skilled in the state of the art. Each one has a double-pane window for the projector light beam to shine out of the box and onto the screen. Each box also has measures for adequately cooling the projectors.

A computer, or computers, placed in an adjacent room for sound isolation purposes drive the speakers with audio information transmitted from the surrogate at the remote location. Anechoic foams are optionally placed on the walls of the user's room. The anechoic foams eliminate local reflections and permit the ambiance of the remote location to be recreated. Furthermore, by using black anechoic foams, stray reflection of light is reduced and the contrast of the display screens is increased.

Another component of having a telepresence in a surrogate's location is that the user can have a full 360-degree field of view of the surrogate's location without turning the surrogate's head or body when the user turns the user's head and body. For example, in a business meeting a user can turn to look at participants around or even behind the surrogate without having to turn the surrogate. This capability is non-existent in prior videoconferencing systems.

Thus, the telepresence system provides multiple data communication streams in multiple media that were previously not existent.

Figure 1A:
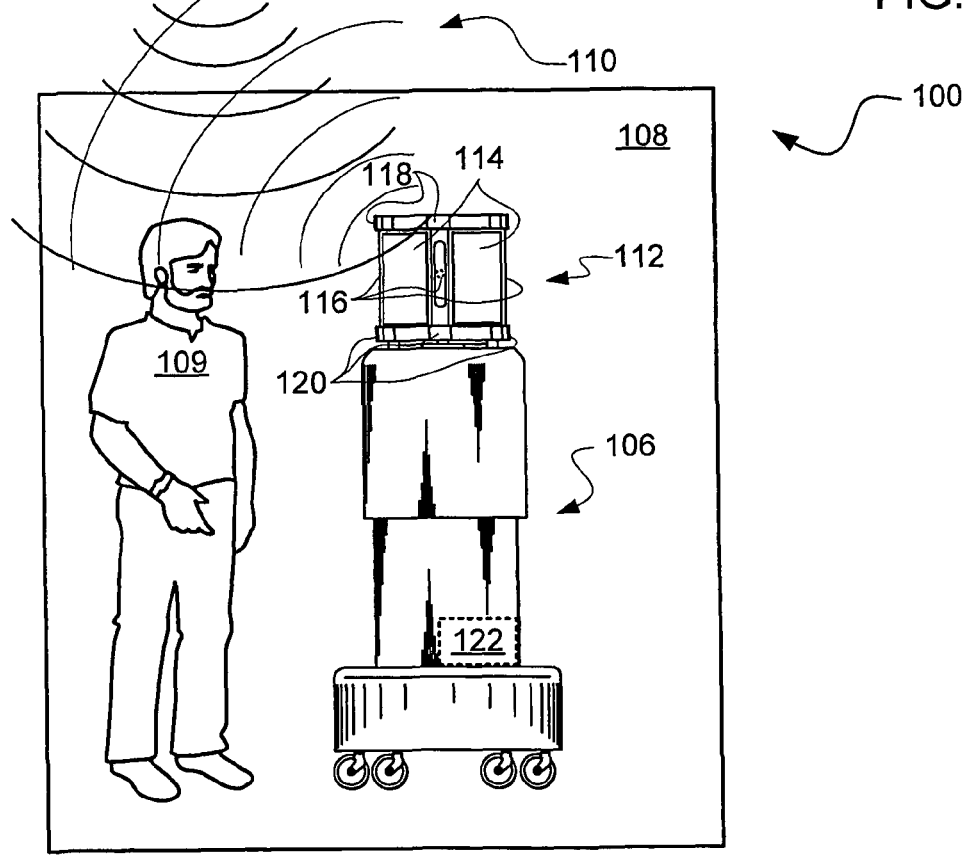
Figure 1B:
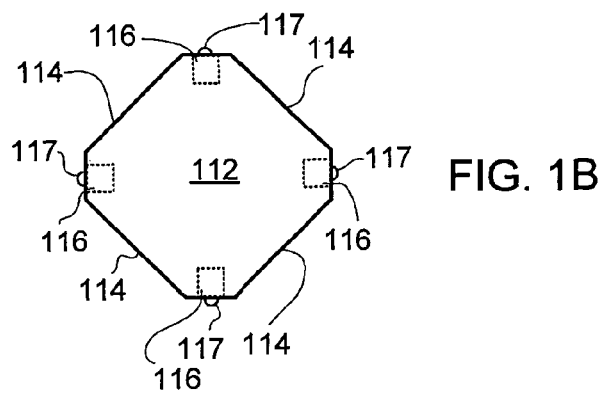

Referring now to FIGS. 1A and 1B, therein are shown a Mutually-Immersive Mobile Telepresence (E-Travel) System 100, which includes a user's display cube 102 at a user's location 104 and a surrogate 106 at a remote location, a surrogate's location 108, where a meeting with one or more participants, such as a participant 109, is occurring. The surrogate 106 is connected to the user's display cube 102 via a high-speed communication network 110.

The surrogate 106 has a surrogate's head 112 including a number of surrogate's displays, such as four LCD panels, which make up a surrogate's displays 114. The surrogate's displays 114 are generally rectangular and have a center level midway up the displays.

One or more cameras, such as four surrogate's cameras 116, are positioned in the corners of the surrogate's head 112 horizontally level with the center level of the surrogate's displays 114. The surrogate's cameras 116 are at about eye level and to view and capture a 360° surround live video outwardly from the surrogate 106 at the surrogate's location 108 for display on the user's display cube 102.

One or more microphones, such as four directional surrogate's microphones 118, are positioned in the top corners of the surrogate's head 112 to capture sounds 360° around the surrogate 106. One or more speakers, such as the four surrogate's speakers 120 are positioned in the bottom corners of the surrogate's head 112 to provide directional audio of the user's voice.

The surrogate 106 contains surrogate's computer/transceiver systems 122 for connecting to surrogate's communication devices such as surrogate's cameras 116 and the surrogate's microphones 118, processing and compressing communication information, such as video and audio data, and sending it to presentation devices for a user 124 in the user's display cube 102.

The surrogate's computer/transceiver systems 122 also receive a live video view of the user's head 125, facing in a direction 126, from user's camera arrays 128 at the four corners of the user's display cube 102. The live video view is a 360° view of the user's head 125. The four images of the user's head 125 are displayed on the surrogate's displays 114 in the surrogate's head 112 with the user's image facing in the direction 126.

The surrogate's computer/transceiver systems 122 also receive audio signals from the user 124, process them, and output them to the surrogate's speakers 120.

The surrogate 106 may be pushed around to different positions at the surrogate's location 108 or may be remotely controlled for movement by the user 124. The video from the surrogate's cameras 116 in the surrogate's head 112 are compressed as simultaneous parallel video streams and transmitted over the high-speed communication network 110 to user's computer/transceiver systems 130 at the user's location 104.

Figure 2:
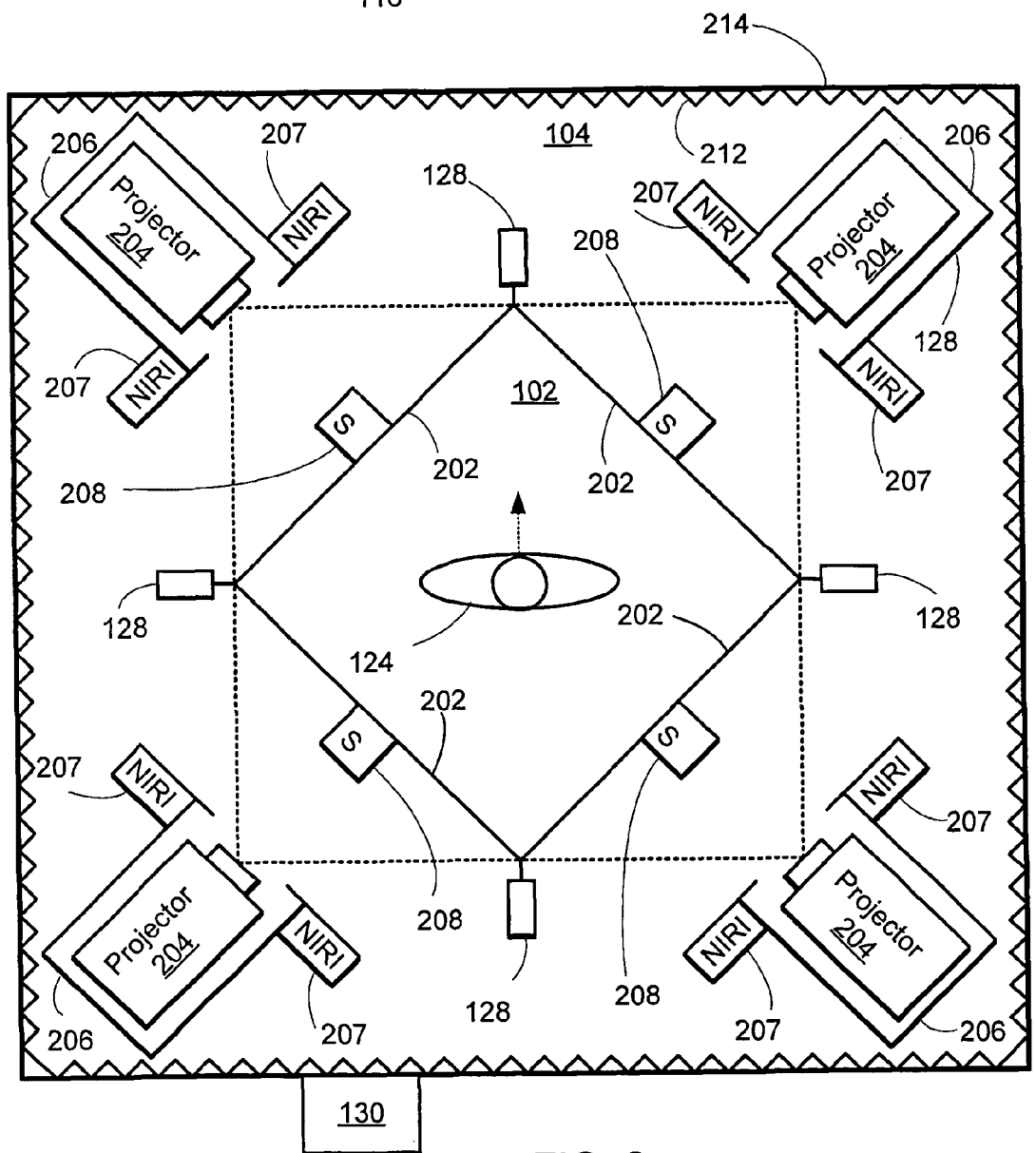
FIG. 2 shows a user's display cube at a user's location.

Referring now to FIG. 2, therein is shown the user's display cube 102 at the user's location 104. The video view from the surrogate's cameras 116 (of FIG. 1) in the surrogate's head 112 is presented on the walls of the user's display cube 102.

In one embodiment, the presentation is by way of a back projection onto projection screens 202 of the user's display cube 102 by four user's projectors 204. Where the participant 109 (of FIG. 1) is directly in front of one of the surrogate's displays 114, the image of the participant 109 will be projected in the corners of two of the projection screens 202.

The user's projectors 204 are housed in "hush boxes" 206 to make them virtually inaudible. The hush boxes 206 are built using sound isolation techniques familiar to those skilled in the state of the art. Each of the hush boxes 206 has a double-pane window for the projector light beam to shine out of the hush box 206 and onto the projection screen 202. Each of the hush boxes 206 also has measures for adequately cooling the user's projectors 204.

Adjacent the hush boxes 206 are near-infrared illuminators (NIRIs) 207 for providing light in the near-infrared portion of the spectrum for near-infrared cameras in the user's camera arrays 128.

User's speakers 208 are mounted above and below each projection screen 202. By driving each pair of speakers 208 with equal volume signals the sound appears to come from the center of each of the projection screens 202 to provide directional audio or hearing of one or more participants 109 from the four surrogate's microphones 118 on the surrogate 106.

The user's computer/transceiver systems 130, which can be placed in an adjacent room (for sound isolation purposes), present the user's speakers 208 with audio information transmitted in simultaneous parallel data streams from the surrogate 106 at the surrogate's location 108. Anechoic foams 212 are (optionally) placed on walls 214 of the user's location 104. The anechoic foams 212 eliminate local reflections and permit the ambiance of the surrogate's location 108 to be recreated. Furthermore, by using black anechoic foams 212, stray reflection of light is reduced and the contrast on the projection screens 202 is increased.

The images of the meeting room on the projection screens 202 in the user's display cube 102 are presented "life size". This means that the angle subtended by objects on the projection screens 202 is roughly the same angle as if the user 124 were actually at the surrogate's location 108 viewing it personally. However, it will be understood that the reproduction is not exact unless the user's head is centered in the user's display cube 102. However, the present invention is still an improvement since images are not presented at "life size" in conventional videoconferencing systems.

As would be evident from the above disclosure, images on the projection screens 202 is presented at life size in order for eye contact to be accurately preserved at more than one point. For example, if images are not presented at life size, a movement of the user's eyes by X degrees to the left will not be directed at objects X degrees to the left at the surrogate's location 108, for a given value of X (e.g., 30°).

In the above, the user's display cube 102 has four sides so there are four surrogate's displays 114. If the display is not a cube but has fewer or more sides, there will be a number of surrogate's displays equal to the number of sides.

Figure 3:
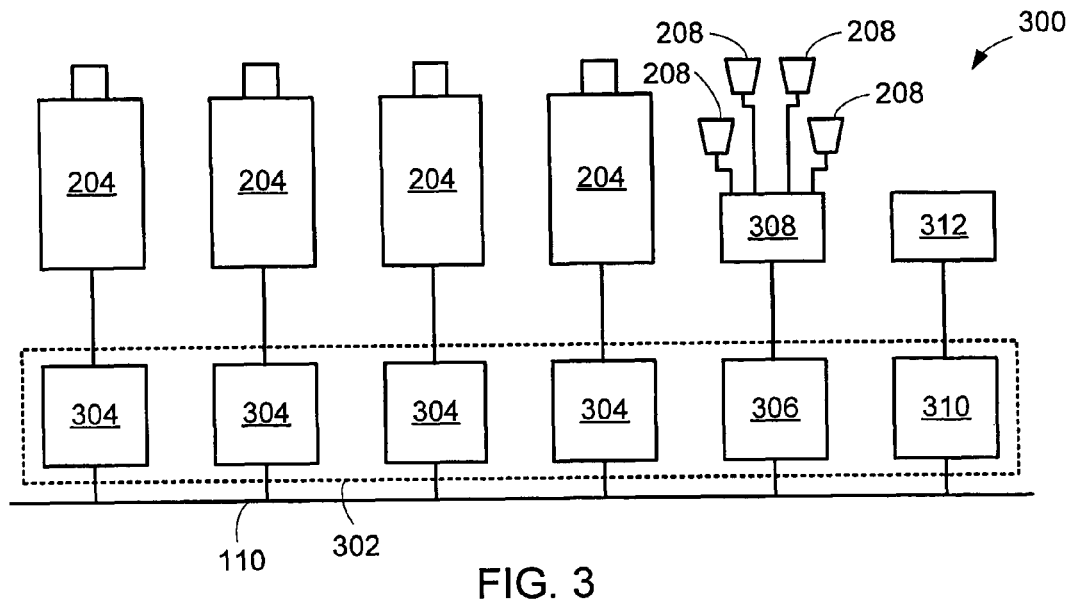
FIG. 3 shows a multi-stream multimedia system in accordance with an embodiment of the present invention.

Referring now to FIG. 3, therein is shown a multi-stream multimedia video recorder system 300 in accordance with an embodiment of the present invention. The recorder system 300 can be a part of the E-travel system 100.

Just as with other media such as telephones or television, it is often useful to have recordings of events captured using those technologies. Telephone and other audio conversations can be recorded using audio tape recorders. Television broadcasts are commonly recorded using videocassette recorders (VCRs) or digital video recorders (DVRs). These recordings can be used to preserve important events, provide documentary descriptions of remote places or times, provide entertainment and amusement, and many other uses.

Recording and playback of E-travel system events are also valuable for many similar purposes. However, current audio-visual recorders are not well suited to the recording and playback of many simultaneous synchronized parallel video and audio streams, as is the case with mutually-immersive mobile telepresence. In addition, there is a desire to support editing of stored content, similar to a dual-tape editing VCR. Therefore, an embodiment of the present invention provides recording, playback, and editing capabilities for systems with many simultaneous parallel audio and video streams.

The recorder system 300 records from a computer system 302 at the location of the user 124. The computer system 302 in one embodiment includes four display personal computers (PCs) 304 used to drive the user's projectors 204, an audio personal computer (PC) 306 that processes audio input and output for an audio amplifier 308 driving the user's speakers 208, and a control personal computer (PC) 310 providing overall control and controlled at an operator console 312.

In a further embodiment, the control PC 310 also performs the user's head-tracking functions to reduce the total number of personal computers.

During recording, the operator console 312 instructs the control PC 310 to instruct the display PCs 304 and the audio PC 306 to record audio and video content from the remote surrogate location to their local disks.

It has been discovered that the control PC 310 needs to output a high precision time code that is defined as a time code that is a function of the frame rate. It has been discovered that the high precision time code should be about 60 times a second, twice the highest possible frame rate, and that the audio and display PCs 304 and 306 need to include this time code with data being written to their disks.

This high precision time code reduces relative time code errors between streams. During replay of stored content, the control PC 310 instructs the display PCs 304 to read content from their local disks and play it out according to a time code sent from the control PC 310. In this way, all the display PCs 304 and the audio PC 306 remain in synchronization. Data streams being written to disk are first packetized and time stamped with the time code. The simultaneous parallel video streams can be compressed, and each frame in the compressed video should start on a new packet for easy random access.

The audio PC 306 and the display PCs 304 store content on their disks in a compressed form used for sending the data over the network. In one embodiment, audio data rates are around 1-2 bMbits/sec and display data rates are around 2.5 Mb/sec per stream. Translated into megabytes per second, this means that the display PCs 304 would only need to read or write about 31-2.5 KB/sec, which is not a high data rate for modem commodity disk drives.

In order to make sure that data is buffered properly, data should be read and written from a large ring buffer before being read or written by a separate thread to the disks. The video data rate amounts to a total of about 18.75 MB/min or 1.125 GB/hr. With modern disk capacities exceeding 200 GB, well over 100 hours of content at baseline encoding levels could be stored per disk on each PC. Since the recordings are made to disks connected to each PC, the operator console 312 has the control PC 310 specify a file name associated with the stream on disk. The operator console 312 also includes controls similar to that of a VCR or DVR, since all users are likely familiar with this interface.

Figure 4:
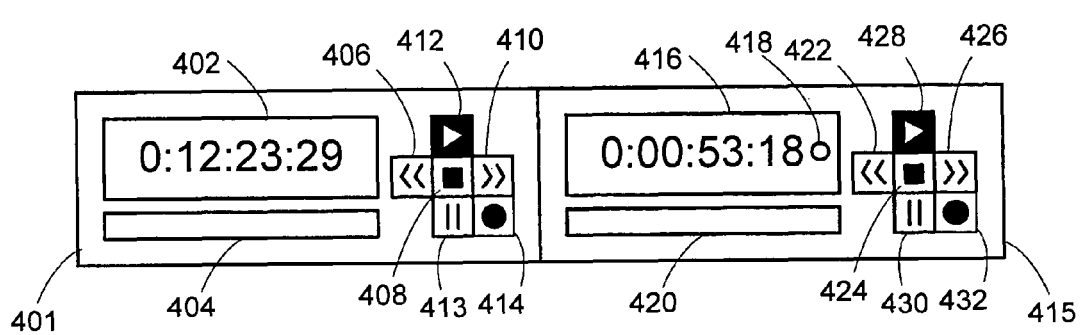
FIG. 4 shows a multi-stream multimedia video recorder control system in accordance with an embodiment of the present invention.

Referring now to FIG. 4, therein is shown a multi-stream multimedia video recorder control system 400, which could be part of or separate from the operator console 312.

Functionalities supported by the recorder control system 400 include play, stop, pause, fast forward (FF) and reverse (REW), fast play FF and REW both play and FF or REW selected, and slow play forward or reverse FF or REW selected in addition to pause.

In this way frame accurate positioning of the streams may quickly be achieved. When a button is depressed, it becomes reverse video to denote its state.

A recorder section 401 of the recorder control system 400 shows a time code display 402 in hours, minutes, seconds, and frames (30ths of a second). Below the time code display 402 is an associated stream file name display 404. To the right is a REW button 406, a stop button 408, and a FF button 410. Above the stop button 408 is a play button 412, below is a pause button 413, and next to the pause button 413 is a record button 414.

An edit section 415 of the recorder control system 400 shows a time code display 416 in hours, minutes, seconds, and frames (each a 30th of a second). A circle 418 to the right of the time code turns red if recording is in progress. Below the time code display 416 is an associated stream file name display 420. To the right is a REW button 422, a stop button 424, and a FF button 426. Above the stop button 424 is a play button 428, below is a pause button 430, and next to the pause button 430 is a record button 432.

The functionalities of the recorder control system 400 can be implemented with the time code always be displayed for an open stream. Play is simply playback at a normal rate of speed. If the pause button 413 is selected, the time code stops advancing, so audio stops and the video is frozen. The stop button 408 has the same functionality as the pause button 413, except it is a different state.

If FF or REW is selected from a stop state, display of video is not required. Instead, data is skipped either forwards or backwards in the file while updating the time code until the FF or REW is stopped by the user. FF or REW during pause denotes slow play forward and reverse, respectively.

Slow play forward and reverse is easy to implement in video, as the time code is just advanced more slowly e.g., at ⅐ the speed.

It has been discovered that audio is difficult, but it has been found that each sample can just be duplicated to produce output samples for every original sample; e.g., 7 output samples for ⅐ the speed. The audio is difficult to understand, but breaks in phrases are clearly discernable.

It has been discovered that FF and REW during play is even more difficult, since the display PCs 304 probably do not have the central processing unit (CPU) speed required to play back video and audio significantly faster than real time. In this case, it has been discovered that running 7× faster (assuming a group of pictures (GOP) length of 7) may be accomplished by skipping everything but I-frames (intra-frames or key frames for compressed video) in the video and skipping 6 out of 7 samples in the audio. This will make the audio unintelligible, but gaps between sentences should be discernable.

Because files up to a gigabyte remain unwieldy, there is also a desire to support editing of stored content, similar to a dual-tape editing VCR. In this mode content is played from one stream in the recorder section 401, and optionally recorded to another stream in the edit section 415.

For example, if a portion of a previously recorded stream is desired for use as part of a demonstration, one stream may be advanced up to the desired in point and paused. Then the output stream can be set to record. When the recorder section 401 is unpaused, data from the recorder section 401 will start to be written to the recording file specified on the edit section 415.

When record is pushed without data coming from the playback side, nothing will be written. In this way, a composite recording may be constructed from portions of many source recordings. When the out point is reached, the edit section 415 is stopped or paused.

During recording of content from a remote surrogate's location, it is common courtesy to denote to other people that they are being recorded and this may be accomplished by activation of a tally indicator 117 of FIG. 1B. The tally indicator 117 may be a light that is flashed on the surrogate on for one second, off for one second in a number of different ways. In one embodiment, the tally indicator 117 is a red LED mounted near each of the surrogate's cameras 116 in each corner of the surrogate's head 112. In another embodiment, a blinking red spot could be written to the lower right corner of the surrogate's displays 114 displaying the users head.

In order to understand a previously-recorded experience using the recorder system 300 of FIG. 3, is played on the surrogate in the lower-right corner of the user's display cube 102 of FIG. 1. This is similar to a picture-in-picture capability present in many commercial video conferencing systems. The user's voice during the experience could also be mixed into the four audio channels output into the user's display cube 102.

In the description above, content is stored on disk at the normal operational bit rates. To the extent that the display PCs 304 could support it, higher quality video could also be recorded and stored. For example, high-definition video could be recorded offline into a file, and then played back to demonstrate future potential telepresence capabilities.

Figure 5:
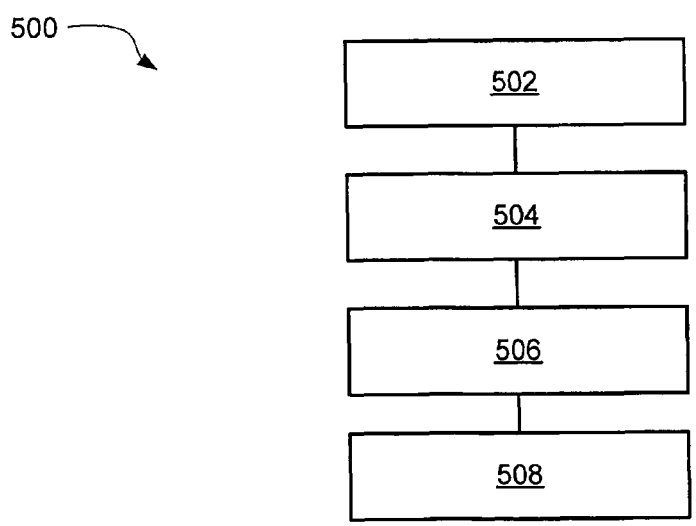
FIG. 5 shows a multi-stream multimedia system in accordance with the present invention.

Referring now to FIG. 5, therein is shown a multi-stream multimedia system 500 in accordance with the present invention. The system 500 includes: a block 502 of providing simultaneous parallel communication streams from a plurality of communication devices, a block 504 of displaying the simultaneous parallel communication streams on a plurality of presentation devices, a block 506 of providing a high precision time code for synchronizing the simultaneous parallel communication streams, and a block 508 of recording each of the simultaneous parallel communication streams using the high precision time code.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A method for implementing a multi-stream multimedia system comprising:
   providing, to a first location, a first portion of simultaneous parallel communication streams from a first plurality of communication devices directed radially toward a second location;
   presenting, from the first location, the first portion of simultaneous parallel communication streams on a first plurality of presentation devices directed radially away from the first location;
   providing, to the second location, a second portion of simultaneous parallel communication streams from a second plurality of communication devices directed radially away from the first location;
   presenting, to the second location, the second portion of simultaneous parallel communication streams on a second plurality of presentation devices directed radially toward the second location;
   providing a high precision time code for synchronizing presenting the simultaneous parallel communication streams; and recording each of the simultaneous parallel communication streams using the high precision time code.

2. The method as claimed in claim 1 wherein:
providing the simultaneous parallel communications streams provides simultaneous parallel video streams; and further comprising:
providing fast forwarding video play by displaying predetermined frames of the simultaneous parallel video streams.

3. The method as claimed in claim 1 wherein:
recording the simultaneous parallel communication streams further comprises:
providing simultaneous parallel video streams;
packetizing the simultaneous parallel video streams; and
time stamping packets of the simultaneous parallel video streams with the high precision time code.

4. The method as claimed in claim 1 wherein:
recording the simultaneous parallel communication streams further comprises:
providing simultaneous parallel video streams;
packetizing the simultaneous parallel video streams; and
starting each new frame on a new packet.

5. The method as claimed in claim 1 wherein:
presenting the simultaneous parallel communication streams further comprises:
presenting simultaneous parallel video streams on a plurality of displays; and
playing recorded simultaneous parallel video streams on portions of each of the plurality of displays.

6. A method for implementing a multi-stream multimedia system comprising:
providing, to a first location, a first portion of simultaneous parallel video and audio streams respectively from a first plurality of cameras and directional microphones directed radially toward a second location;
providing, to the second location, a second portion of simultaneous parallel video and audio streams from a second plurality of cameras and directional microphones directed radially away from the first location;
transmitting the first portions of simultaneous parallel video and audio streams to a first receiver at the first location;
transmitting the second portions of simultaneous parallel video and audio streams to a second receiver at the second location;
displaying the first portion of simultaneous parallel video streams and playing each of the first portion of simultaneous parallel audio streams from the first receiver respectively on a first plurality of displays and speakers directed radially away from the first location;
displaying the second portion of simultaneous parallel video streams and playing each of the second portion of simultaneous parallel audio streams from the second receiver respectively on a second plurality of displays and speakers directed radially toward the second location;
providing a high precision time code of at least twice the highest video frame rate for synchronizing displaying and playing the simultaneous parallel video and audio streams;
recording each of the simultaneous parallel video streams on a plurality of display computers using the high precision time code; and
recording each of the simultaneous parallel audio streams on an audio computer using the high precision time code.

7. The method as claimed in claim 6 further comprising:
providing slow audio play by periodic sampling of the simultaneous parallel audio streams, duplicating samples, and playing the samples;
providing fast forwarding video play by displaying only I-frames of the simultaneous parallel video streams; and
providing reverse audio play by periodic sampling of the simultaneous parallel audio streams and skipping a predetermined number of samples.

8. The method as claimed in claim 6 wherein:
recording each of the simultaneous parallel video streams further comprises:
packetizing the simultaneous parallel video streams; and
time stamping packets of the simultaneous parallel video streams with the high precision time code; and
recording each of the simultaneous parallel audio streams further comprises:
packetizing the simultaneous parallel audio streams; and
time stamping packets of the simultaneous parallel audio streams with the high precision time code.

9. The method system as claimed in claim 6 wherein:
recording each of the simultaneous parallel video streams further comprises:
compressing the simultaneous parallel video streams;
packetizing the simultaneous parallel video streams; and
starting each new frame on a new packet.

10. The method as claimed in claim 6 wherein:
displaying the simultaneous parallel video streams on the first and second plurality of displays further comprises:
playing recorded simultaneous parallel video streams on portions of each of the first and second plurality of displays corresponding to the display upon which the recorded simultaneous parallel video stream was displayed during recording.

11. A multi-stream multimedia system comprising:
a first plurality of communication devices at a first location for providing a first portion of simultaneous parallel communication streams to a second location, the first plurality of communication devices being directed radially toward the first location;
a first plurality of presentation devices at a second location for presenting the first portion of the simultaneous parallel communication streams directed radially away from the second location;
a second plurality of communication devices at the second location for providing a second portion of the simultaneous parallel communication streams to the first location, the second plurality of communication devices being directed radially away from the second location;
a second plurality of presentation devices at the first location for presenting the second portion of the simultaneous parallel communication streams directed radially toward the first location;
a computer system for providing a high precision time code for synchronizing presenting the simultaneous parallel communication streams; and
a recorder system for recording the simultaneous parallel communication streams on the computer system using the high precision time code.

12. The system as claimed in claim 11 wherein:
the recorder system further comprises:
a recorder section for providing recorded simultaneous parallel communication streams; and
an edit section for editing predetermined portions of the recorded simultaneous parallel communication streams.

13. The system as claimed in claim 11 wherein:
the computer system:
  provides simultaneous parallel video streams as part of the simultaneous parallel communication streams;
  packetizes the simultaneous parallel video streams; and
  time stamps packets of the simultaneous parallel video streams with the high precision time code.

14. The system as claimed in claim 11 wherein:
the computer system:
  provides simultaneous parallel video streams as part of the simultaneous parallel communication streams;
  packetizes the simultaneous parallel video streams; and
  starts each new frame on a new packet.

15. The system as claimed in claim 11 wherein:
the computer system presents recorded simultaneous parallel communication streams on portions of each of the first and second plurality of presentation devices.

16. The system as claimed in claim 11 wherein:
the first and second plurality of communication devices includes: a plurality of cameras for providing simultaneous parallel video streams and a plurality of directional microphones for providing simultaneous parallel audio streams;
the first and second plurality of presentation devices includes a plurality of speakers for playing each of the simultaneous parallel audio streams;
the computer system includes a control computer for providing the high precision time code of at least twice the highest video frame rate for synchronizing the simultaneous parallel video and audio streams;
the computer system includes an audio computer using the high precision time code for recording each of the simultaneous parallel audio streams; and
further comprising:
a transmitter for transmitting the simultaneous parallel video and audio streams from the plurality of cameras and the plurality of directional microphones; and
a receiver for receiving the simultaneous parallel video and audio streams from the transmitter for the computer system.

17. The system as claimed in claim 16 wherein:
the computer system includes an audio computer for providing:
  slow audio play by periodic sampling of the simultaneous parallel audio streams, duplicating samples, and play of the samples;
  fast forwarding video play by display of only I-frames of the simultaneous parallel video streams; and
  reverse audio play by periodic sampling of the simultaneous parallel audio streams and skipping a predetermined number of samples.

18. The system as claimed in claim 16 wherein:
the computer system further comprises display computers to:
  packetize the simultaneous parallel video streams; and
  time stamp packets of the simultaneous parallel video streams with the high precision time code; and
the computer system further comprises an audio computer to:
  record simultaneous parallel audio streams;
  packetize the simultaneous parallel audio streams; and
  time stamp packets of the simultaneous parallel audio streams with the high precision time code.

19. The system as claimed in claim 16 wherein:
the computer system provides for:
  compression of the simultaneous parallel video streams;
  packetization the simultaneous parallel video streams; and
  start of each new frame on a new packet.

20. The system as claimed in claim 16 wherein:
the computer system provides for:
  display of the simultaneous parallel video streams on the plurality of displays; and
  play of recorded simultaneous parallel video streams on portions of each of the plurality of displays corresponding to the display upon which the recorded simultaneous parallel video stream was displayed during recording.

* * * * *

UNITED STATES PATENT AND TRADEMARK OFFICE
CERTIFICATE OF CORRECTION

PATENT NO. : 7,720,353 B1
APPLICATION NO. : 11/158457
DATED : May 18, 2010
INVENTOR(S) : Norman Paul Jouppi It is certified that error appears in the above-identified patent and that said Letters Patent is hereby corrected as shown below:

In column 10, line 21, in Claim 9, after "method" delete "system".

Signed and Sealed this

Twenty-fourth Day of August, 2010

David J. Kappos
*Director of the United States Patent and Trademark Office*